US007269633B2

(12) United States Patent
Allan (10) Patent No.: US 7,269,633 B2
(45) Date of Patent: Sep. 11, 2007

(54) METHOD AND SYSTEM FOR PLAYBACK OF DYNAMIC HTTP TRANSACTIONS

(75) Inventor: Ronald C. Allan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 10/314,466

(22) Filed: Dec. 6, 2002

(65) Prior Publication Data

US 2004/0111488 A1    Jun. 10, 2004

(51) Int. Cl.
*G06F 15/16* (2006.01)
(52) U.S. Cl. .................................... 709/217
(58) Field of Classification Search ................. 709/217
See application file for complete search history.

(56) References Cited

U.S. PATENT DOCUMENTS

| | | | | |
|---|---|---|---|---|
| 5,611,038 | A * | 3/1997 | Shaw et al. ............. | 715/500.1 |
| 5,715,453 | A * | 2/1998 | Stewart ..................... | 715/513 |
| 5,737,592 | A | 4/1998 | Nguyen et al. ............. | 395/604 |
| 5,809,250 | A | 9/1998 | Kisor ..................... | 395/200.57 |
| 5,890,172 | A | 3/1999 | Borman et al. ............. | 707/501 |
| 6,041,360 | A | 3/2000 | Himmel et al. ............. | 709/245 |
| 6,105,043 | A | 8/2000 | Francisco et al. ........... | 707/513 |
| 6,178,433 | B1 | 1/2001 | Nakamura et al. .......... | 707/513 |
| 6,195,679 | B1 | 2/2001 | Bauersfeld et al. ......... | 709/203 |
| 6,209,027 | B1 | 3/2001 | Gibson ..................... | 709/218 |
| 6,243,707 | B1 | 6/2001 | Humpleman et al. ....... | 707/102 |
| 6,314,432 | B1 | 11/2001 | Potts, Jr. .................. | 707/104.1 |
| 6,408,360 | B1 | 6/2002 | Chamberlain et al. ...... | 711/124 |
| 6,581,117 | B1 * | 6/2003 | Klein et al. ................. | 710/110 |
| 6,675,387 | B1 * | 1/2004 | Boucher et al. ............ | 725/105 |
| 6,848,104 | B1 * | 1/2005 | Van Ee et al. .............. | 719/310 |

FOREIGN PATENT DOCUMENTS

| | | |
|---|---|---|
| EP | 0889418 A2 | 1/1991 |
| WO | WO 01/98859 A2 | 12/2001 |

OTHER PUBLICATIONS

"Methodology for Graphical Containment for the Queuing of Actions", *IBM Technical Disclosure Bulletin*, vol. 35, n. 4B, pp. 41-43, Sep. 1992.
"Internet Macros: A System and Method for Automation of Internet Activities", *Research Disclosure*, No. 42772, p. 1485, Nov. 1999.

* cited by examiner

*Primary Examiner*—David Y. Eng
(74) *Attorney, Agent, or Firm*—Joseph R. Burwell; Jeffrey S. LaBaw (57) ABSTRACT

A method, system, apparatus, and computer program product are presented for recordation and playback of transactions within a web browser or similar client application. A transaction recordation and playback utility captures dynamic information upon recordation and/or playback of a web-browser-based transaction. The dynamic information is derived from the DOM-related (Document Object Model) information that is maintained within the web browser application. Using information from a previously recorded transaction, the transaction recordation and playback utility searches the current DOM-related information for current values of dynamic parameters, thereby allowing generation of a complete and appropriate HTTP request on every subsequent playback of a recorded transaction.

30 Claims, 6 Drawing Sheets

```xml
<?xml version='1.0' encoding='UTF-8'?>
<http-transaction version='sti 1.7'>

<!--first request
   <request source='gesture'>   ~ 602
      <request-line><![CDATA[GET http://supernova/ http/1.1]]></request-line>
      <meta-info>
         <meta tag='URI'><![CDATA[http://supernova/]]></meta>
      </meta-info>
   </request>

<!--second request
   <request source='gesture'>
      <request-line><![CDATA[POST http://supernova/servlet/.../UITaskService?task=Logon http/1.1]]></request-line>
      <headers>   ~ 606
         <h1 source='user'>Content-Type: application/x-www-form-urlencoded</h1>
      </headers>
      <content>   ~ 608
         <w3c-enc type='text'><![CDATA[username=admin]]></w3c-enc>
         <w3c-enc type='password'><![CDATA[password=YWRtaW4=]]></w3c-enc>
      </content>
      <meta-info>   ~ 610
         <meta tag='URI'><![CDATA[http://supernova/servlet/.../UITaskService?task=Logon]]></meta>
         <meta tag='FORM'><![CDATA[action=/servlet/.../UITaskService?task=Logon]]></meta>
         <meta tag='INPUT'><![CDATA[name=]]></meta>
      </meta-info>
   </request>
                                                                    604
<!--third request                                                    )
   <request source='gesture'>
      <request-line><![CDATA[GET http://supernova/servlet/.../UITaskService?task=sti-dyn0 http/1.1]]></request-line>
      <meta-info>
         <meta tag='URI'><![CDATA[http://supernova/servlet/.../UITaskService?task=Logoff]]></meta>
      </meta-info>
   </request>
</http-transaction>
```

METHOD AND SYSTEM FOR PLAYBACK OF DYNAMIC HTTP TRANSACTIONS

BACKGROUND OF THE INVENTION

1. Field of the Invention

The present invention relates to an improved data processing system and, in particular, to a method and apparatus for information processing associated with graphical user interfaces. Still more particularly, the present invention relates to playback of previously recorded user events within a graphical user interface.

2. Description of Related Art

There are many scenarios in which a user must repeat a task within a software application. Before the availability of graphical user interfaces, a software application would be controlled through a command line interface. In order to quickly repeat tasks in such applications, batch files containing data and many commands would be used to provide repetitious input through the command line interface. After graphical user interfaces became widespread, utilities were created to generate so-called user macros in which a user could store a sequence of user interface events for subsequent playback. For example, a user may need to perform a common set of photo editing operations on many digital images within a photo editing application. Each operation may require the selection of a menu item followed by the selection of options and the specification of parameters within a dialog window, including the name of a file that contains a digital image on which the photo editing operation is to be performed. Recorder utilities allow a user to capture the events within the application's graphical user interface that are required to initiate and complete the photo editing operation that is desired by the user.

With the development of the World Wide Web, recorder utilities have been created for automating repeatable sequences of user activities within a web browser. These utilities facilitate the replay of regular user activities on the Internet, such as periodically checking a web-based mail service or downloading information from a web site. A typical web-based macro recorder utility operates in conjunction with a web browser to record user events within the graphical user interface that is presented by the web browser, including selection of hyperlinks within web pages. Since the events are recorded with respect to the web browser application, the user can automate activities that span multiple web sites. This type of macro recorder utility allows a user to create, view, edit, and replay the recorded macros.

Several problems arise, however, in the playback of user-recorded, web-browser-based macros. Recordation and playback of HTTP transactions is challenging because of the dynamic nature of web sites that have become more sophisticated in the manner in which they provide web-based content and services. Technologies that are employed by web sites may include dynamic session identifiers, dynamic cookies, URLs (Uniform Resource Locators) that are dynamically produced by client-side scripting mechanisms, such as JavaScript, ECMAScript, and VBScript, and many other dynamic web-related technologies. For example, a web-browser-based macro recorder might record a URL comprising dynamic information, and playback of the recorded information produces an error because the dynamic information that was generated during the user's previous session is no longer valid during the user's current session.

Therefore, it would be advantageous to have a web-browser-based, user-event macro recordation and playback technology that recognizes these potential problems by capturing and using dynamic information that allows for the generation of correct web service requests upon playback.

SUMMARY OF THE INVENTION

A method, system, apparatus, and computer program product are presented for automating transaction requests within a transaction recordation and playback utility on behalf of a software application at a client. The utility retrieves a recorded transaction request; prior to retrieving the recorded transaction request during a playback mode of operation, the utility may record a transmitted transaction request during a recordation mode of operation. In response to a determination that the recorded transaction request comprises a dynamically determined parameter, a value for the dynamically determined parameter is obtained from a data structure that is maintained by the software application; the value may be retrieved through appropriate Application Programming Interfaces (APIs). The utility then generates a transaction request message based on the recorded transaction request using the obtained value as a value for the dynamically determined parameter within the transaction request message, and the transaction request message is sent from the client to a server. In a preferred embodiment, the software application is a web browser, and the data structure that is maintained by the software application represents a Document Object Model (DOM).

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 6 depicts a text file that shows a script that is generated during the recordation mode of operation of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
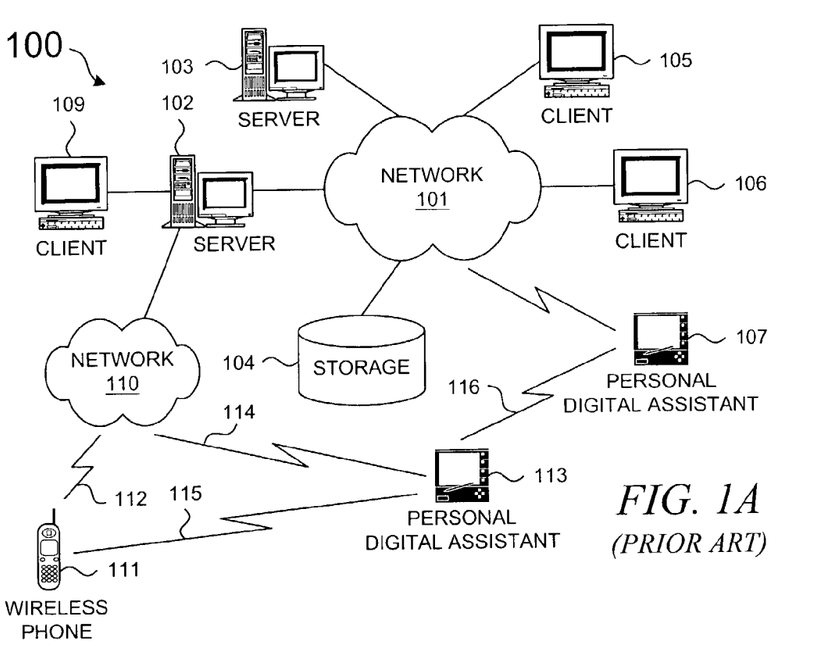
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
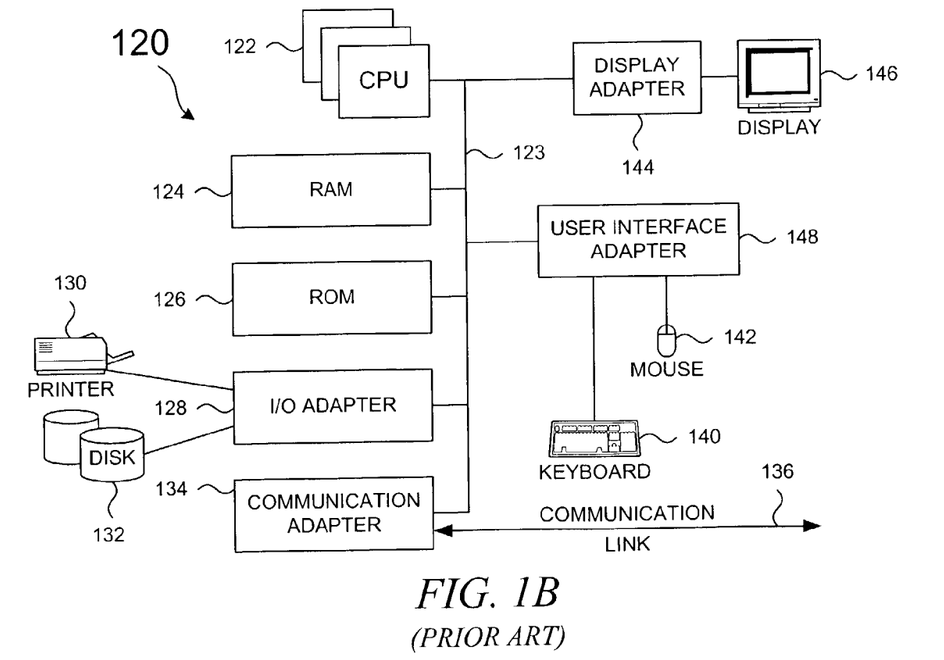
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to a method and system for playback of recorded user events. Prior to describing the present invention in more detail, a description is provided for prior art solutions for recordation and playback of user events within a web-browser-based macro recorder utility.

Figure 2:
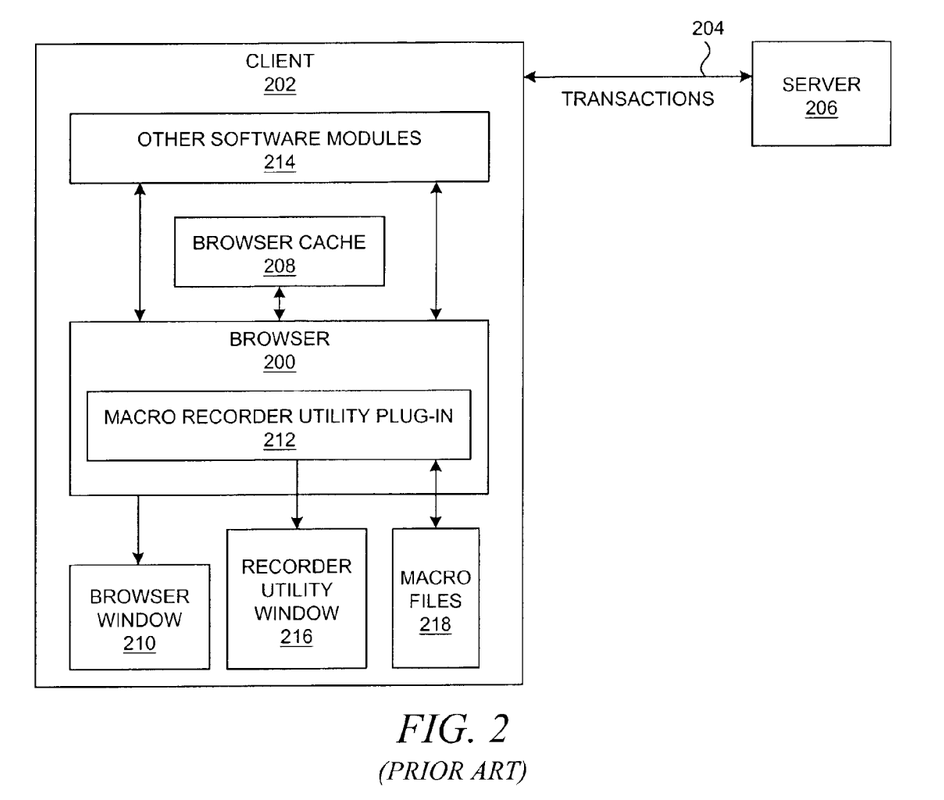
FIG. 2 depicts a block diagram for a client that supports a typical web-browser-based macro recorder utility.

With reference now to FIG. 2, a block diagram depicts a client that supports a typical web-browser-based macro recorder utility. Browser software module 200 on client 202 generates transactions 204 for server 206. When a user enters a Uniform Resource Locator (URL) or (more generally) a Uniform Resource Identifier (URI) into a location data entry field within the browser or when a user clicks on a hypertext link within a Web page, the browser generates an HTTP request that contains the URI that was selected or entered by the user. Typically, the server returns a Web page, which is then stored by the browser in browser cache 208. The browser renders the Web page and presents the Web page within browser window 210 on a client-connected display device either concurrently with additional web resource retrieval operations or after retrieving all resources for the request.

A user may select hyperlinks or perform other actions within the browser window. In this example, the user has also invoked a typical macro recorder application that may have many different forms, such as macro recorder utility plug-in 212 that operates as a client-side plug-in within the browser. Alternatively, the macro recorder utility could have the form of a distinct application that interoperates in conjunction with the browser application or that operates in cooperation with the operating system of the client to obtain information about user-generated events, also called user gestures, within the client graphical user interface (GUI). In either case, the macro recorder utility can interoperate with other software applications or modules 214. The user may interact with the macro recorder utility through recorder utility window 216, although the recorder utility could present relevant information within the browser window. After recording a user activity session, the macro recorder utility generates and stores a macro or user activity script in macro files 218; the user may review, edit, and delete these macros when desired through the macro recorder utility.

When the browser generates an HTTP request, the server returns a document, e.g. a web page, which is then parsed by the browser. A document can be very broadly described as a set of information items that can be processed as a unit. Within the context of Web-based applications that manipulate structured documents that are formatted in accordance with markup languages derived from Standard Generalized Markup Language (SGML), e.g., XML or HTML, a document is an ordered collection of elements; an element is an object that contains all the content between the start tag and the end tag that demarcate the element along with any set of attributes that are defined for the element.

If the browser determines that the received web page is actually a container page, i.e. contains in-line resources embedded within the page, then the browser attempts to complete additional transactions for those in-line resources; examples of in-line resources include images or applets. The browser may follow an HTTP redirection response from the server, which causes the browser to send a new request that specifies the redirection URL.

Figure 3:
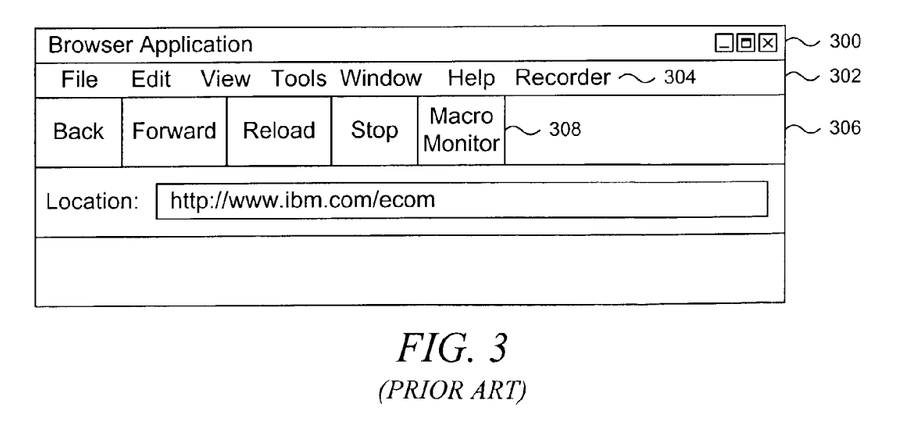
FIG. 3 depicts a graphical user interface (GUI) window for a browser application with an integrated macro recorder utility.

With reference now to FIG. 3, a GUI window is depicted for a browser application with an integrated macro recorder utility. A browser application on a client device presents GUI window 300 that has menu bar 302. In this example, a macro recorder utility has already been invoked, and the macro recorder utility has installed "Recorder" menu 304 within menu bar 302. The user may access menu 304 to operate the macro recorder utility. Window 300 also displays browser tool bar 306 that provides a set of GUI controls for initiating a small subset of browser application commands. In this example, the macro recorder utility has installed "Macro Monitor" button 308 that allows a user to open a window controlled by the macro recorder utility; the macro recorder utility window may provide a user with a real-time view of any recorded user events.

As mentioned above, prior-art solutions have many problems with the playback of user-recorded, web-browser-derived macros because the recorded information may contain dynamically generated information that is not valid from one session to another session.

Turning now to the remaining figures, the present invention is directed to a method and system for providing accurate playback of previously recorded HTTP transactions that may contain dynamic information, as described below in more detail with respect to the remaining figures. In contrast to the prior art, the transaction recordation and playback utility in the present invention attempts to avoid making explicit assumptions about various types of recorded information, such as information concerning the location of a hyperlink within a web page, the content of the hyperlink for each subsequent transaction, or the configuration of the client device that may be used when a transaction is replayed.

More particularly, the present invention records transactions and then plays back recorded transactions within a web browser or similar client application. With respect to the present invention, a transaction may be characterized as a set of one or more communication protocol actions between a client and a server. Since most communication traffic from a web browser are HTTP messages, the present invention is primarily interested in the recordation and playback of HTTP transactions that are generated as the result of user gestures within a web browser.

The present invention solves problems with prior-art solutions by recognizing that recorded transactions may contain dynamically generated information. Hence, a recorded transaction may result in the generation of slightly different content within transactions upon each subsequent playback of the recorded transaction.

In brief summary, the transaction recordation and playback utility of the present invention solves this problem by capturing dynamic information upon recordation and/or playback of a web-browser-based transaction. The dynamic information is derived from the DOM-related (Document Object Model) information that is maintained within the web browser application. Using information from a previously recorded transaction, the transaction recordation and playback utility searches the current DOM-related information for current values of dynamic parameters, thereby providing input to the transaction recordation and playback utility so that it can generate a complete and appropriate HTTP request on every subsequent playback of a recorded transaction.

Figure 4:
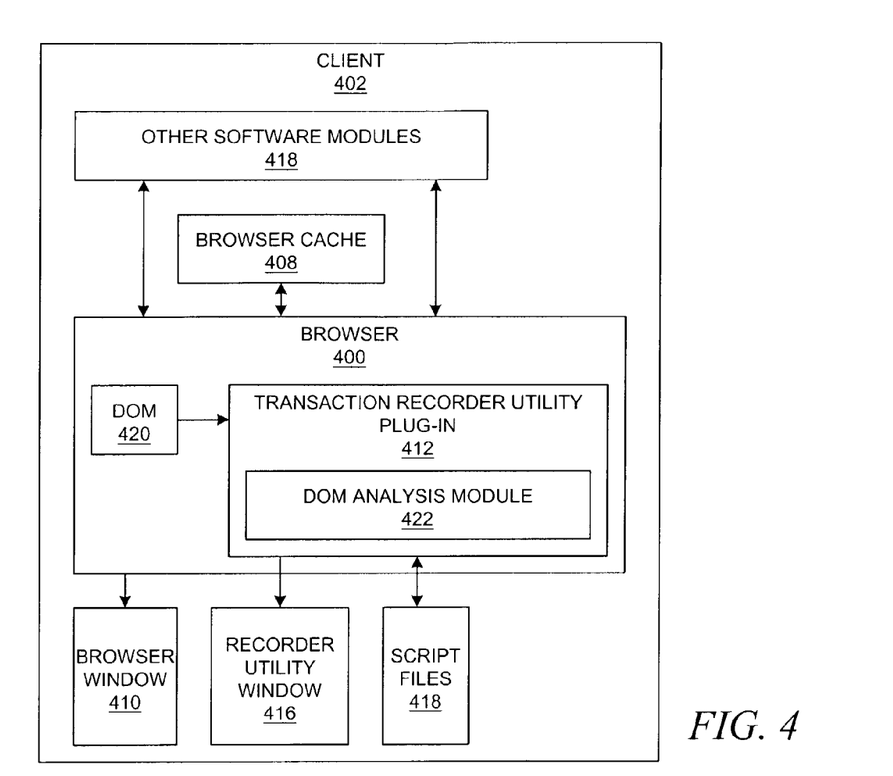
FIG. 4 depicts a block diagram that shows a transaction recordation and playback (TRP) utility in operation with a browser on a client device in accordance with an embodiment of the present invention.

With reference now to FIG. 4, a block diagram depicts a transaction recordation and playback (TRP) utility in operation with a browser on a client device in accordance with an embodiment of the present invention. In a manner similar to that shown in FIG. 3, browser software module 400 on client 402 generates transactions 404 for server 406, which returns web pages in response. The browser stores received web pages in browser cache 408, and the browser displays received web pages in browser window 410. In this example, the user has already invoked TRP utility plug-in 412 that comprises the functionality of an embodiment of the present invention.

The TRP utility can interoperate with other software applications or modules 414, including client-side proxies. The user may interact with the TRP utility through TRP utility window 416, although the TRP utility could present relevant information within the browser window. After recording a user activity session, the TRP utility generates and stores a macro or user activity script in script files 418; the user may review, edit, and delete these scripts when desired through the TRP utility.

It should be noted that the browser and the TRP utility are herein described as software modules because they may be implemented in a variety of form factors, such as fully-featured applications, plug-ins, or Microsoft® ActiveX™ controls that are under the control of another application. One of ordinary skill in the art would understand that the steps, means, or instructions of a process, apparatus, or computer program product that incorporates the present invention is not limited by the form in which the present invention is implemented.

Moreover, the TRP utility has two major modes of operation: a recordation mode and a playback mode; each mode of operation could be embodied in different modules or utilities that understand the formatting of the script files in which recorded transactions are stored. However, the present invention should not be interpreted as excluding the characterization of other modes of operation, e.g., a hybrid mode of operation in which the TRP utility is able to perform both recordation and playback of transactions in some parallel fashion.

Although not discussed with respect to FIG. 3 above, as the browser receives and processes web pages and other objects from the server, the browser places information about received documents and other data into its DOM-related data structures, data objects, or similar datastores, shown as DOM 420 in FIG. 4.

The World Wide Web Consortium (W3C), which is responsible for promulgating many of the specifications for Web-related technologies, has defined its Document Object Model in the following manner:

> The Document Object Model is a platform- and language-neutral interface that will allow programs and scripts to dynamically access and update the content, structure and style of documents. The document can be further processed and the results of that processing can be incorporated back into the presented page.

The W3C has issued its "W3C DOM Activity Statement" concerning the direction of the evolution of the Document Object Model:

> W3C's Document Object Model (DOM) is a standard API (Application Programming Interface) to the structure of documents; it aims to make it easy for programmers to access components and to delete, add, or edit their content, attributes and style. In essence, the DOM makes it possible for programmers to write applications which work properly on all browsers and servers and on all platforms. While programmers may need to use different programming languages, they do not need to change their programming model.
>
> W3C's Document Object Model thus offers programmers a platform- and language-neutral program interface which will make programming reliably across platforms with languages such as Java and ECMAScript a reality.

It should be noted that a DOM is more than a typical data model; it is intended to capture structure and behavior. Hence, the DOM comprises a set of Application Programming Interfaces (APIs) in conjunction with, or as a characteristic of, a set of objects, and the DOM can be implemented in a variety of language-dependent or language-independent manners.

As should be apparent, a specification for the W3C's Document Object Model continues to be improved with the expectation that widely available browsers and other types of Web-based applications will continue to support the W3C's DOM. At any given time, the Netscape® Navigator/Communicator and Microsoft® Internet Explorer browsers may support versions or so-called "flavors" of the W3C's DOM specification. Although some of the examples provided below with respect to the figures are drawn from an implementation of the present invention in conjunction with the Microsoft® Internet Explorer browser, the present invention is intended to work with a variety of Document Object Models and should not be limited to any particular version or flavor of a Document Object Model.

As mentioned above, TRP utility 412 operates in association with browser application 400 to record transactions that are initiated and/or completed by the browser during a recordation phase, including HTTP redirections. In addition, as explained in more detail below, the TRP utility also uses the DOM-related APIs to capture dynamic information from the DOM-related information that is maintained within the web browser application, preferably through DOM analysis module 422 within the TRP utility; the DOM-related information is captured upon recordation and/or playback of a web-browser-based transaction.

While the examples herein depict the present invention as operating in conjunction with a web browser, it should be noted that one having ordinary skill in the art would understand that the present invention could also be described as operating in conjunction with other forms of client software applications that also process communication protocol transactions and that also maintain DOM-like information. Moreover, although the examples herein depict the present invention as operating in conjunction with a single client software application, assuming that the software platform of a client device provided sufficient support, the present invention could operate in conjunction with multiple client software applications.

Figure 5:
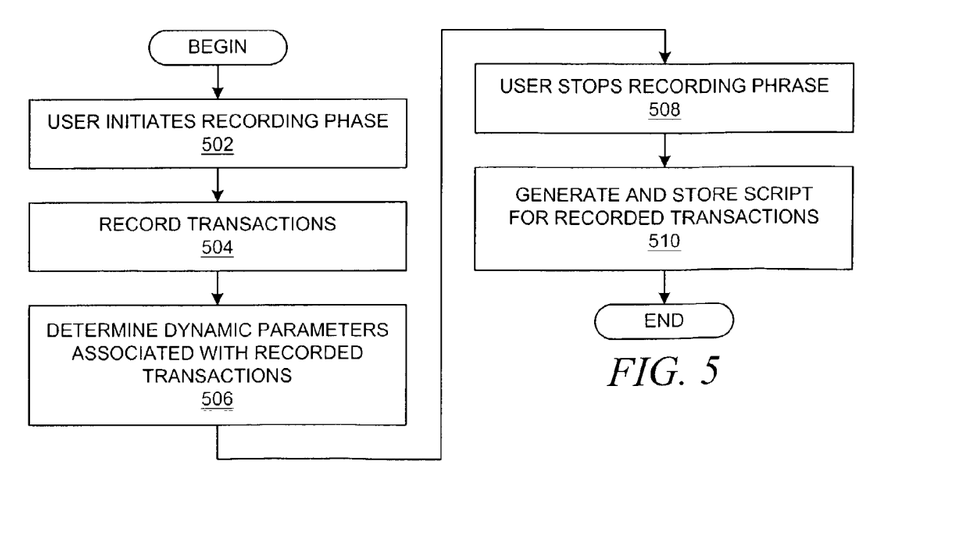
FIG. 5 depicts a flowchart that shows a process for capturing and recording transactions.

With reference now to FIG. 5, a flowchart depicts a process for capturing and recording transactions. The process begins with the user initiating the recordation of transactions from a web browser (step 502), e.g., by selecting a toolbar button or menu item through a TRP utility as discussed above. This step essentially begins a recordation phase of user interaction with the TRP utility; at some later point in time after the recordation mode of operation, the user can playback any recorded scripts through the same TRP utility during a playback mode of operation.

The TRP utility records user gestures as the user operates the web browser (step 504), e.g., as the user types in URLs or clicks URL representations within the web page that is currently being displayed by the web browser. The TRP utility then determines the dynamic parameters within the recorded transactions (step 506). The manner in which the dynamic parameters are determined is described in more detail below with respect to the representation of recorded transactions that are shown in FIG. 6. Step 506 may be performed in real-time during the recordation phase, or this step may be performed as a type of post-processing activity after the recordation phase has been completed, i.e. after step 508.

In either case, at some later point in time, the user performs some user interface action, e.g., by selecting a toolbar button or menu item through a TRP utility, that indicates that the user would like to conclude the recordation mode of operation (step 508). The TRP utility then generates and stores the script of recorded transactions (step 510), and the process is complete. The script may be stored in the form of an XML-formatted document, as shown in FIG. 6. Alternatively, the script is generated in real-time while information about the transactions are being gathered by the TRP utility.

Referring again to step 504, a more detailed description is provided hereinbelow for the manner in which the TRP utility records user gestures as the user operates the web browser. As is well-known, the user may perform many gestures within a GUI window of a web browser application. As is also well-known, when a user performs certain gestures within a web browser, e.g., by entering a resource identifier into a location data entry field within the browser or by clicking on a hypertext link within a web page, the browser generates an HTTP request that contains the URI that was indicated in some manner by the user. Hence, although the web browser may receive many GUI events from the client's operating system for all of the user's gestures, only some of those gestures will result in the generation of an HTTP request by the web server. More generally, only some user gestures within a client software application will result in the generation of transactions by the client software application.

Step 504 recites that the TRP utility records user gestures as the user operates the web browser, and the present invention may record a variety of information that is related to a user gesture event. Although most prior-art macro utilities are interested in recording the GUI events that are the result of the user gestures within the web browser, the present invention is primarily interested in the communication protocol events that are the result of the user gestures within the web browser; as mentioned above, a transaction may be characterized as a set of one or more communication protocol actions between a client and a server. Hence, a more particular description of step 504 is that the TRP utility records HTTP requests that are generated by a client software application in response to user gestures within the client software application. It should be noted that a single user gesture may result in the generation of more than one HTTP request as the browser automatically follows redirections, meta-refresh references, etc.

Given that the present invention is primarily interested in the recordation (and subsequent playback) of communication protocol events that are the result of user gestures in a client software application, a more detailed description is now provided for a preferred recordation process for capturing those communication protocol events. It should be noted, however, that other recordation processes could be used by the present invention without affecting the scope of the present invention.

A preferred recordation process is temporally based as operates as follows. After the user performs a gesture, the TRP utility receives a notification of a GUI event. For example, after the user clicks a hyperlink within a web page, the TRP utility would be notified of a mouse-button-down event by the client operating system. As another example, the TRP utility would be notified of a keyboard event by the client operating system after the user hits the "Enter" key on the keyboard, e.g., after entering a URI into a location data entry field within a web browser. The TRP utility could register with the operating system for the notification of certain classes of events so that every GUI event does not have to be filtered and processed.

After determining that the GUI event may cause the web browser to generate an HTTP request, the TRP utility sets a timer and disables all mouse click events or keyboard events until the timer expires. It may be assumed that the TRP utility has sufficient operating system priority or authorization to modify the client runtime environment in this manner.

While the timer is running, the TRP utility records any HTTP requests that are transmitted by the web browser. For example, the TRP utility may operate a proxy through which all HTTP requests must pass, which provides the opportunity for the TRP utility to make a copy of each HTTP request without regard to the reason for the transmittal of the HTTP request, e.g., user selection of a hyperlink or a redirection that is followed by the web browser.

After the timer expires, the disabled GUI events are re-enabled, and the user may perform additional actions. This series of steps would be repeated throughout the recordation mode of operation of the TRP utility.

The timer would be configurable by the user in order to accommodate the greatest time delta that could occur between a user gesture and a web browser action. For example, when the user clicks on a hyperlink, the resulting page might actually have a meta-refresh tag that redirects the web browser to another page after 30 seconds. Hence, the timer needs to be set to value that is greater than this time delta in order to accommodate any potential latency. By using timers, there is no ambiguity in determining the user gestures that are associated with any outgoing HTTP requests; assuming that the client platform has been appropriately configured, the outgoing HTTP requests can only be the result of the user gestures that occurred between the execution of the timers. Moreover, there is no dependency on complex GUI event processing, e.g., determining whether a mouse-button-down event occurred at a particular "(x,y)" location within the content area of a web browser window.

With reference now to FIG. 6, a text file depicts a script that is generated during the recordation mode of operation of the present invention. As mentioned above, the present invention is primarily interested in recording the HTTP requests that are generated by a web browser in response to user gestures. Although FIG. 6 depicts only HTTP requests, other types of transactions could be stored in a script file; in addition, other types of information could be stored that is not specifically derived from a transaction but is useful for characterizing the user gesture in some manner.

The captured HTTP requests may be expressed as a combination of several data items: the type of request method, i.e. GET or POST; replacement of URI values with a dynamic parameter placeholder; preservation of the explicit or original URI; a set of elements that describe hyperlink, if appropriate, such as an anchor tag within a frame; other information about the web page; if the HTTP request method is a POST method, then the body of the POST message as well as the type of input field with which the content was associated, such as a text field, a password field, a hidden field, etc.; and/or any other information that may be appropriate for accurately recreating the HTTP request upon playback. The original request could be stored for reference while a modified version of the original request could also be stored in association with the unmodified version. The particular content and format of the example that is shown in FIG. 6 is described in more detail below.

The example script file that is shown in FIG. 6 is an XML-formatted file. Other file formats may be supported by the present invention. However, a markup language format is preferred as the TRP utility may comprise a markup language parser for interpreting documents containing markup language, such as web pages.

As mentioned above, a script file could contain information other than HTTP requests, including transactions for other communication protocols, but the example script file in FIG. 6 shows a series of HTTP requests. The ordinal position of the HTTP request is directly related to the chronological order in which the HTTP request was captured; the first HTTP request that was captured is stored as the first HTTP request within the script file, although other embodiments could provide different storage schemes. While the example script file in FIG. 6 contains only information that would be relevant for an accurate playback of the recorded transactions, other metadata could be recorded in the script file, e.g., information about the time at which the script was recorded, information about the configuration of the client, browser, and/or TRP utility, such as version numbers, and any other information that might be useful for the processing of script file from the perspective of management of the script file.

Referring to FIG. 6, a "request" element, such as element 602, defines a single HTTP request for a transaction. In this example, the only attribute of this element is "source", and any request captured by the recorder has a source attribute value of "gesture". Alternatively, browser embedded applications that are responsible for generating transactions could be designated with a source attribute value of "embedded". In other words, the types and content of the request elements could be expanded or modified. The child elements of the "request" element are described in more detail below.

The "request-line" element is the combination of the HTTP method, the URL, and the HTTP protocol version that were used in the recorded request. In this request line, any parameter values will contain a special dynamic placeholder, such as "sti-dyn0" in "request-line" element 604; the dynamic placeholder could be any expression that is unlikely to appear in an URL parameter value, i.e. the likelihood of a name clash would be almost zero. Alternatively, the dynamic placeholder could be stored elsewhere other than within the recorded request information with a pointer into the recorded request that indicates the location or data item that has been determined to be a dynamic parameter.

Since the HTTP protocol was designed to be a stateless protocol in which each HTTP request and corresponding HTTP response is considered to open and close a communication session, the HTTP protocol does not have a built-in mechanism for a web server to track a given user's session from the perspective of the server. Hence, web applications have evolved various mechanisms to maintain state information. For example, URIs can have parameter values that change from one user session to another.

However, the TRP utility is coded with various rules that guide the TRP utility in finding dynamic parameters within any captured information. To locate dynamic parameters, the TRP utility searches the captured information for particular information within HTTP headers, URIs, text strings, message bodies, or other data items or content fields that are likely to contain dynamically generated information. For example, the TRP utility may be configured, e.g., through configuration or resource files that are read by the TRP utility when it is initialized or instantiated, to scan for particular markers, such as "=", "?", etc. These markers are likely to indicate dynamic parameters, i.e. parameters with dynamically assigned values, and the TRP utility can process these values while also inserting special placeholders so that the recorded requests do not have to be analyzed for indications of dynamic parameters each and every time that the TRP utility needs to perform a playback of a recorded transaction. Alternatively, pointers are stored that refer back to the positions of these dynamic parameters within a recorded transaction.

The "headers" element, such as element 606, contains the child element "hl", which contains a single attribute "source"; it can be of type "user" or "browser". A type of "user" designates that the header was specified by the recorder utility, i.e., programmed in to the logic. A type of "browser" designates that the header was specified by the browser control via the headers parameter of the "BeforeNavigate2" callback method. The element text can be any valid HTTP header.

The "content" element, such as element 608, contains the child element "w3-enc", which contains a single attribute "type". The value it contains is the value drawn from the DOM at record time. Such values are based on HTML INPUT element types, such as "text", "password", "hidden", etc. The text value of this element is the POST data contained in the HTML INPUT element.

The "meta-info" element, such as element 610, contains the child element "meta", which contains a single attribute "tag". The value of this attribute is one of the following: "URI", "A", "FORM", "FRAME", "INPUT", or "AREA".

"URI" represents the original URL that was accessed by the request during the recordation mode of operation. A "meta" element with a "tag" attribute of type "URI" will be present in each recorded request. The text value of this element is the original URL accessed at record time.

"A" represents the HTML "anchor" element. The text value of this element is based on what is determined to be the strongest type of meta information for this element. The order of preference is "innerText", "outterText", "innerHTML", and "outterHTML". These preferences are DOM-based elements that are present within the DOM-related information during record and playback.

"FORM" is the HTML FORM element; the text value of this element is the key and value of the "action" attribute. "FRAME" is the HTML FRAME element; the text value of this element is the key and value of the "name" attribute. "INPUT" is the HTML INPUT element; the text value of this element is the key and value of the "name" attribute. "AREA" is the HTML AREA element; the text value of this element is the key and value of the "alt" attribute. The ordering of the "metal" elements is significant and has the following possible combinations:

URI [FRAME|FORM|A|AREA]
FRAME [FORM]? [A|AREA]?
FORM, INPUT

Figure 7:
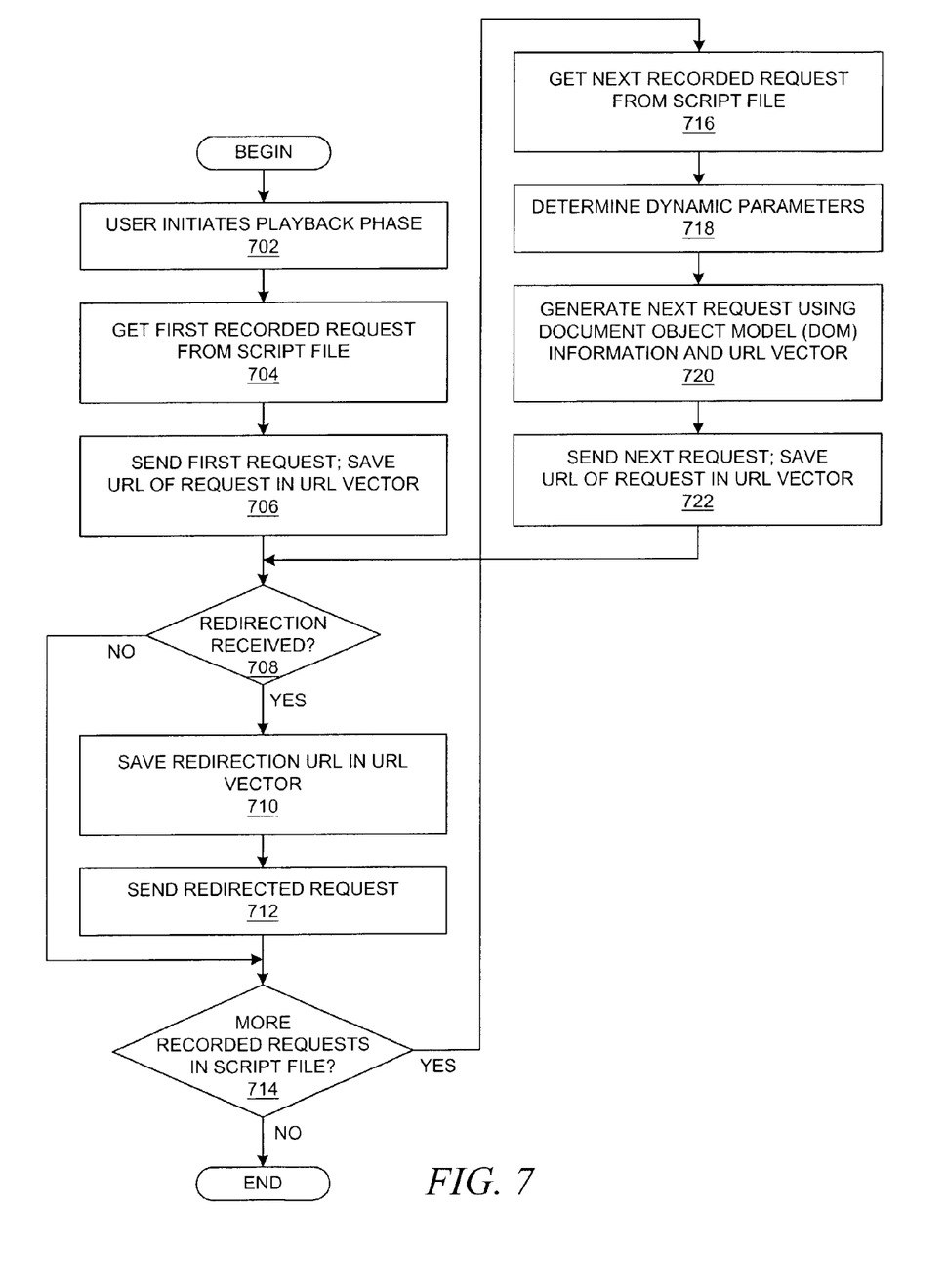
FIG. 7 depicts a flowchart that shows a process for playback of recorded transactions in accordance with an embodiment of the present invention.

With reference now to FIG. 7, a flowchart depicts a process for playback of recorded transactions in accordance with an embodiment of the present invention. The process begins when the user initiates playback within the TRP utility (step 702), e.g., by selecting a toolbar button or menu item through a TRP utility as discussed above. The user may set various parameters within the TRP to control various aspects of the playback mode of operation, e.g., the file name for the script that the user wishes to play back.

The TRP utility obtains the first recorded request from the script file (step 704), and the first request is replayed (step 706), preferably without any modification. In other words, using the script file example in FIG. 6, the TRP utility obtains the first request element from the script and then generates and sends an HTTP request for the URL (or more generally, URI) that is specified in the script. In addition, at step 706, the TRP utility saves the URL of the request in a URL vector for subsequent use, as explained in more detail below.

At the beginning of the transaction script, it may be assumed that the first recorded request did not contain any dynamic parameters; therefore, it does not require the substitution of any dynamic information by the TRP utility upon playback. This assumption should be accurate because it may be assumed that the user initiated the recordation mode of operation prior to generating any requests to a particular web server. In other words, it may be assumed that the recordation mode of operation was started in a manner such that the web browser was in a "clean state", i.e. the web browser had not yet populated its DOM-related data structures with information that would affect the determination of dynamic parameters within a request. If necessary, when the user initiates a recordation mode of operation, the TRP utility could force a clean browser state in some manner by purging the web browser's memory cache, document cache, cookie cache, etc., which is an option that is provided by many commercially available web browsers. Similarly, the TRP utility could force a clean browser state when the user initiates a playback mode of operation. The user could be provided with a selectable option by the TRP utility to reset the web browser to a clean state in these circumstances.

The TRP utility then determines if a redirection is received by the web browser (step 708). For example, the redirection could be detected by the TRP utility by receiving the incoming HTTP redirection response from a web server at a proxy that is controlled by the TRP utility or by receiving an outgoing HTTP request from the web browser at a proxy after the redirection has been processed. Alternatively, the TRP utility could receive event notifications with any related information. In any case, if a redirection is not received, then the process merely continues.

However, if a redirection is received, then the URL in the redirection is saved in the URL vector data structure (step 710), after which the HTTP request for the redirection is sent (step 712). If necessary, in a manner similar to the timers that were discussed above during the recordation mode of operation, the TRP utility may wait for a configurable amount of time to ensure that a redirection is or is not received before attempting to send the next request.

A determination is then made as to whether or not the script file contains another recorded transaction (step 714). If not, then the playback mode of operation is concluded, and the process is complete.

If there is another recorded transaction in the script file, then the next recorded transaction is retrieved from the script file (step 716). The TRP utility then determines whether there are any dynamic parameters within the script (step 718). If not, then the request could be generated without substituting any dynamic information.

After a request is performed, the web browser receives a response, processes the response, and populates its DOM-related data structures with information about the received document(s) and/or received objects. In response to each request, the responding web server may generate that is contained within the HTTP response and possibly embedded within the body or content area of the response messages.

In other cases, the web browser enables the generation of dynamic information at the client. For example, the web browser may execute a JavaScript, ECMAScript, and VBScript, and many other dynamic web-related technologies, including applets or ActiveX controls; the execution of any of these may use the DOM information as input to its own processes and may also cause a modification in the DOM-related data structures.

At some point, though, after each request, the DOM-related data structures reflect the results of the request. In addition, depending on how many redirections occurred, the URL vector data structure will contain one or more URLs; the URL vector always contains at least one URL, which is the URL that was used in the first HTTP request. The DOM-related information and URL vector can then be used by the TRP utility to ensure that subsequent requests are correctly generated so that they include any appropriate information, including any information that is only available dynamically and could not have been pre-recorded during the recordation mode of operation.

Assuming that some dynamic parameters are embedded within the recorded request, then the TRP utility generates the next HTTP request while obtaining values for the dynamic parameters from the DOM-related information and the URL vector, if necessary (step 720). The TRP utility then sends the HTTP request for the appropriate URL (step 722); again, the URL of the request is saved in the URL vector. The generation of an HTTP request is described in more detail below with respect to FIG. 8 and FIG. 9. The process then re-enters a processing loop in which the TRP utility again checks for redirections and additional recorded transactions. After all recorded transactions are replayed, the playback mode of operation is complete.

Figure 8:
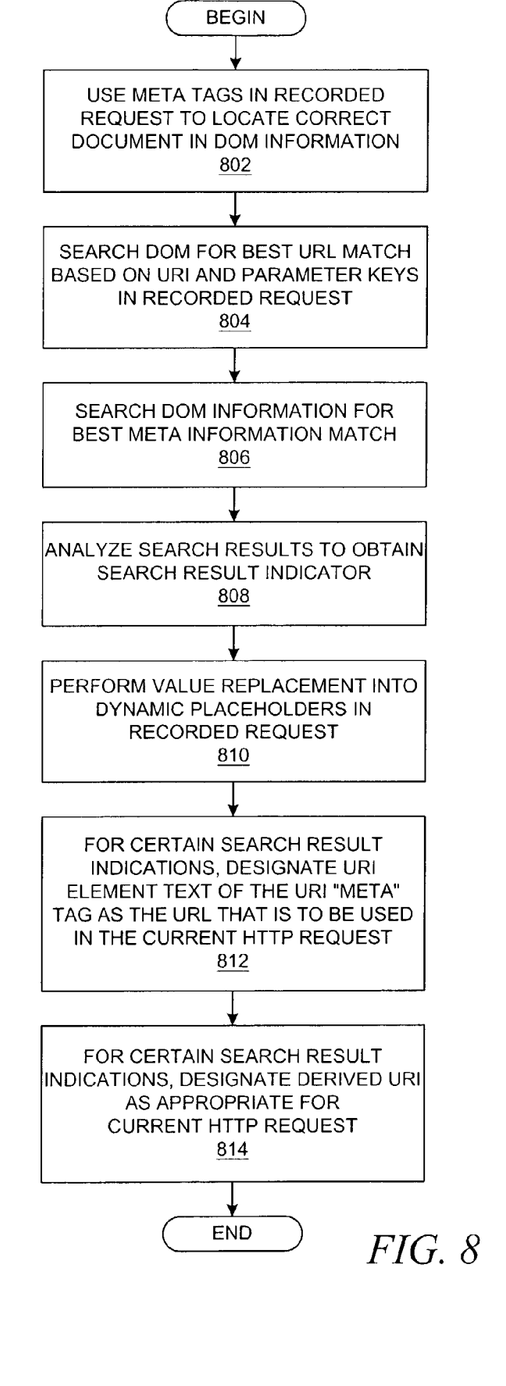
FIG. 8 depicts a flowchart that shows a process for generating an HTTP GET request in accordance with an embodiment of the present invention.

With reference now to FIG. 8, a flowchart depicts a process for generating an HTTP GET request in accordance with an embodiment of the present invention. FIG. 8 shows further detail for the processing that occurs at step 720 in FIG. 7 to generate a next request, in particular, an HTTP GET request message. It should be noted that the process that is shown in FIG. 8 is merely an example of the manner in which a transaction recordation and playback utility could access and process a web browser's DOM-related information through an appropriate set of APIs, and the scope of the present invention may incorporate other DOM-related information processing methods.

The process in FIG. 8 assumes that the TRP utility has already determined that it must substitute at least one value for a dynamic parameter, which may be determined by scanning to see whether the next recorded request that was retrieved from the script file contains a dynamic placeholder, as described above with respect to FIG. 6. However, as mentioned at step 718, the next recorded request may not require any substitution of values for dynamic parameters, and in that case, the next request is sent without any further processing that is shown in FIG. 8.

Hence, assuming that there is a dynamic placeholder in the next recorded request, then the TRP utility begins to process the recorded request in order to generate the next request to be transmitted. To facilitate the terminology, the recorded request that is currently being processed by the TRP utility is called the "current request".

The process begins with the TRP utility using the "meta" tags from the current request to locate, as close as possible, the correct document within the DOM (step 802). Referring to FIG. 6 again, each "request" element contains a "meta-info" element, which in turn contains one or more "meta" elements. For example, if the meta tags are ordered as FRAME, FORM, INPUT, then the TRP utility searches for the FORM within the FRAME described by the FRAME "meta" tag.

While the TRP utility may be described as searching the DOM, the TRP does not maintain nor manage the data structures that represent the DOM, so the TRP does not directly search the data structures that represent the DOM as might occur if the TRP utility was searching its own data structures in memory, such as the URL vector. Instead, the TRP utility uses the appropriate APIs to read or otherwise obtain information from the DOM, whereafter the TRP utility may then search the obtained information.

For example, the Microsoft Internet Explorer DOM reflects the structure of documents that have been processed by the web browser and the documents'embedded markup language formatting. The DOM can be represented as a tree data structure in which the tree fragments correspond to portions of documents. In other words, the hierarchical representation of a tree data structure reflects the hierarchical structure of the document and its DOM. The APIs supplied via the Microsoft IHTMLDocument2 interface make it possible to traverse the stored resources in sequence so that the resources and/or their properties can be retrieved from the DOM and then manipulated by an application as desired. The DOM APIs allow for traversal, insertion, removal, and updating of any portion of a document, such as an in-line resource and/or its properties, although some properties may be read-only with respect to software modules such as plug-ins or software development tools, i.e. software modules other than the browser application.

The TRP utility then searches the DOM for the best URL match based on the URL (or more generally, URI) and the parameter keys of the request (the values are dynamic placeholders) and generates a search result indicator (step 804). The TRP utility also searches the DOM for the best meta information match based on the meta information of the last "meta" element (this would be either an INPUT, AREA, or "A" element) and generates a search result indicator (step 806).

After each search operation, a search result indicator is generated; these indicators could be flags, integers, etc. For example, at step 804, if a match is located, a success value of "1" could be returned; otherwise, the value "0" is returned. Similarly, at step 806, if a "meta" match occurs, then the value "2" is returned; otherwise, the value "0" is returned.

The search result indicators are then analyzed to produce a composite search result indicator (step 808). If integers are used to indicate the results, then the values could be summed and then interpreted in the following manner. The possible sum of the values returned from the URL search and the "meta" search are TOTAL_FAILURE (0), URI_SUCCESS (1), META_SUCCESS (2), or TOTAL_SUCCESS (3). A TOTAL_SUCCESS is expressed as a complete match; the TRP utility found the URL and verified it with the meta data. A META_SUCCESS is a strong match; the TRP utility found the meta information, which this examples designates as a stronger match then the URL match. A URI_SUCCESS or a TOTAL_FAILURE is a weak match; the TRP utility cannot really be sure that it has located the correct URL.

The TRP utility then examines each URL in the URL vector following the original URL for any keys contained in the original URL and does a complete value replacement into the dynamic placeholders (step 810); this step assumes that the values placed in the redirection URLs are always the latest and most significant.

If the TRP utility has a TOTAL_FAILURE or URI_SUCCESS value from step 808 and has not been able to substitute the dynamic information in the URL using the URL vector, then the TRP utility designates the URI element text of the URI "meta" tag as the URL that is to be used in the current HTTP request (step 812).

If the TRP utility has a META_SUCCESS or TOTAL_SUCCESS value, then the TRP utility determines that the derived URL is correct and designates it as such for the URL that is to be used in the current HTTP request (step 814). In any case, the process is then complete. The TRP utility would subsequently place the designated URL in the HTTP request as described above with respect to step 722 in FIG. 7.

Figure 9:
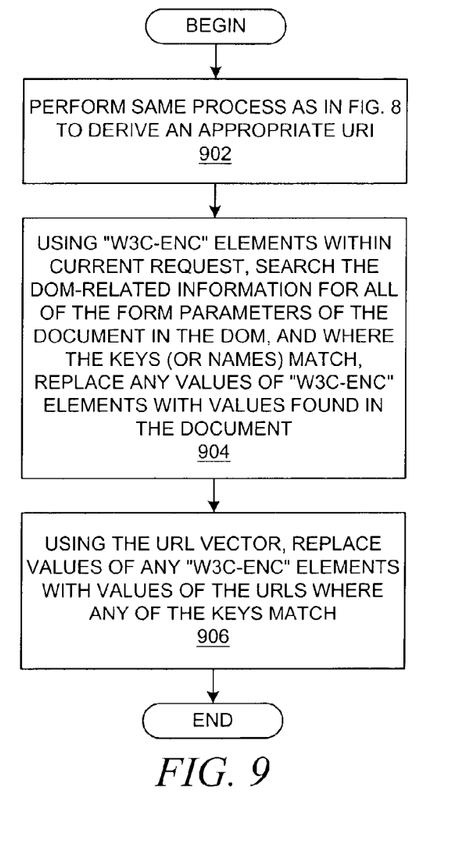
FIG. 9 depicts a flowchart that shows a process for generating an HTTP POST request in accordance with an embodiment of the present invention.

With reference now to FIG. 9, a flowchart depicts a process for generating an HTTP POST request in accordance with an embodiment of the present invention. FIG. 9 shows further detail for the processing that occurs at step 720 in FIG. 7 to generate a next request, in particular, an HTTP POST request message. As also noted above with respect to FIG. 8, the process that is shown in FIG. 9 is merely an example of the manner in which a transaction recordation and playback utility could access and process a web browser's DOM-related information through an appropriate set of APIs, and the scope of the present invention may incorporate other DOM-related information processing methods.

In a manner similar to FIG. 8, the process in FIG. 9 assumes that the TRP utility has already determined that it must substitute at least one value for a dynamic parameter. However, as mentioned at step 718, the next recorded request may not require any substitution of values for dynamic parameters, and in that case, the next request is sent without any further processing that is shown in FIG. 9. Hence, assuming that there is a dynamic placeholder in the next recorded request, then the TRP utility begins to process the recorded request in order to generate the next request to be transmitted. To facilitate the terminology, the recorded request that is currently being processed by the TRP utility is called the "current request".

The process begins with the TRP utility performing the same steps as shown in FIG. 8 to derive a correct (as best as can be determined) URL (step 902). Given that the process is generating an HTTP POST request, additional processing is required to obtain the values that are being returned, i.e. posted, to the web server in response to a form that was received from the web server.

Using the POST content within the current request, i.e. "w3c-enc" elements (which indicate name/value parameters), the TRP utility searches in the DOM-related information for all of the FORM parameters of the document in the DOM, and where the keys (or names) match, the TRP utility replaces any values of "w3c-enc" elements with the values found in the document (step 904).

Using the URL Vector, the TRP utility then replaces the values of any "w3c-enc" elements with the values of the URLs where any of the keys match (step 906); this step handles those sites that use the values of a redirected HTTP GET request as an HTTP POST value in a subsequent request. The process is then complete. The TRP utility has already determined a designated URL that is to be used in the current HTTP POST request. The TRP utility would subsequently place the determined POST parameters along with the designated URL in the HTTP POST request as described above with respect to step 722 in FIG. 7.

The advantages of the present invention should be apparent in view of the detailed description of the invention that is provided above. In contrast to prior-art solutions that have many problems with the playback of user-recorded, web-browser-derived macros, the present invention examines the data structures inside the web browser to obtain dynamic information that is required to generate complete and correct transactions upon playback of previously recorded transactions. From one perspective, the transaction recordation and playback functionality of the present invention regards a recorded transaction as an almost-complete template for a request, not as a complete request in itself as is done by prior-art solutions. The dynamic information that is needed to fill in the placeholders in the almost-complete request template is obtained dynamically and combined with pre-recorded information in order to generate a complete request.

Specifically, a transaction recordation and playback utility examines the web browser's data structures associated with its internal representation of the Document Object Model (DOM) for a requested web pages. In accordance with the type of Document Object Model, the transaction recordation and playback utility determines the information that is dynamic, and the dynamic information is then marked at appropriate locations within the scripts that were generated for a recorded transaction. Upon playback of a script, any previously determined dynamic parameters are identified, and appropriate values for the dynamic parameters are retrieved from the current DOM. HTTP requests are then generated with the dynamically determined information, thereby allowing the script to be replayed without errors and automating a particular user task within the web browser.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for automating transaction requests within a transaction recordation and playback utility on behalf of a software application at a client, the method comprising:
    retrieving a recorded transaction request;
    in response to a determination that the recorded transaction request comprises a dynamic parameter, obtaining a value for the dynamic parameter from a data structure that is maintained by the software application;
    generating a transaction request message based on the recorded transaction request using the obtained value as a value for the dynamic parameter within the transaction request message; and
    sending the transaction request message from the client to a server.

2. The method of claim 1 wherein the software application is a web browser.

3. The method of claim 1 wherein the data structure that is maintained by the software application represents a Document Object Model (DOM).

4. The method of claim 3 further comprising:
    searching the data structure that is maintained by the software application for a URI that matches the URI within the recorded transaction request; and
    determining the obtained value from a document in the DOM that is associated with the matching URI.

5. The method of claim 1 wherein the generated transaction request message is an HTTP GET message.

6. The method of claim 1 wherein the generated transaction request message is an HTTP POST message.

7. The method of claim 1 further comprising:
    further comprising, prior to retrieving the recorded transaction request during a playback mode of operation, recording a transmitted transaction request during a recordation mode of operation.

8. The method of claim 1 wherein the recorded transaction request was previously recorded in response to a user gesture within the software application.

9. The method of claim 1 wherein the recorded transaction request is retrieved from a file containing a series of recorded transaction requests that represent a script.

10. The method of claim 1 further comprising:
    in response to a determination that the recorded transaction request does not comprise a dynamic parameter, generating a transaction request message based on the recorded transaction request.

11. A data processing system for automating transaction requests within a transaction recordation and playback utility on behalf of a software application at a client, the data processing system comprising:
    means for retrieving a recorded transaction request;
    means for obtaining, in response to a determination that the recorded transaction request comprises a dynamic parameter, a value for the dynamic parameter from a data structure that is maintained by the software application;
    means for generating a transaction request message based on the recorded transaction request using the obtained value as a value for the dynamic parameter within the transaction request message; and
    means for sending the transaction request message from the client to a server.

12. The data processing system of claim 11 wherein the software application is a web browser.

13. The data processing system of claim 11 wherein the data structure that is maintained by the software application represents a Document Object Model (DOM).

14. The data processing system of claim 13 further comprising:
    means for searching the data structure that is maintained by the software application for a URI that matches the URI within the recorded transaction request; and
    means for determining the obtained value from a document in the DOM that is associated with the matching URI.

15. The data processing system of claim 11 wherein the generated transaction request message is an HTTP GET message.

16. The data processing system of claim 11 wherein the generated transaction request message is an HTTP POST message.

17. The data processing system of claim 11 further comprising:
    mean for recording, prior to retrieving the recorded transaction request during a playback mode of operation, a transmitted transaction request during a recordation mode of operation.

18. The data processing system of claim 11 wherein the recorded transaction request was previously recorded in response to a user gesture within the software application.

19. The data processing system of claim 11 wherein the recorded transaction request is retrieved from a file containing a series of recorded transaction requests that represent a script.

20. The data processing system of claim 11 further comprising:
    means for generating, in response to a determination that the recorded transaction request does not comprise a dynamic parameter, a transaction request message based on the recorded transaction request.

21. A computer-readable storage medium tangibly embodying a program of instruction executable by a machine for use in a data processing system for automating transaction requests within a transaction recordation and playback utility on behalf of a software application at a client by performing the steps of:

instructions for retrieving a recorded transaction request;

instructions for obtaining, in response to a determination that the recorded transaction request comprises a dynamic parameter, a value for the dynamic parameter from a data structure that is maintained by the software application;

instructions for generating a transaction request message based on the recorded transaction request using the obtained value as a value for the dynamic parameter within the transaction request message; and instructions for sending the transaction request message from the client to a server.

22. The computer program product of claim 21 wherein the software application is a web browser.

23. The computer program product of claim 21 wherein the data structure that is maintained by the software application represents a Document Object Model (DOM).

24. The computer program product of claim 23 further comprising:

instructions for searching the data structure that is maintained by the software application for a URI that matches the URI within the recorded transaction request; and means for determining the obtained value from a document in the DOM that is associated with the matching URI.

25. The computer program product of claim 21 wherein the generated transaction request message is an HTTP GET message.

26. The computer program product of claim 21 wherein the generated transaction request message is an HTTP POST message.

27. The computer program product of claim 21 further comprising:

instructions for recording, prior to retrieving the recorded transaction request during a playback mode of operation, a transmitted transaction request during a recordation mode of operation.

28. The computer program product of claim 21 wherein the recorded transaction request was previously recorded in response to a user gesture within the software application.

29. The computer program product of claim 21 wherein the recorded transaction request is retrieved from a file containing a series of recorded transaction requests that represent a script.

30. The computer program product of claim 21 further comprising:

instructions for generating, in response to a determination that the recorded transaction request does not comprise a dynamic parameter, a transaction request message based on the recorded transaction request.

* * * * *